2,786,020

PURIFICATION OF TOLUIC ACIDS

Lester P. Berriman, Palo Alto, and Chester M. Himel, Menlo Park, Calif., assignors to Richfield Oil Corporation, Los Angeles, Calif., a corporation of Delaware No Drawing. Application November 19, 1952,
Serial No. 321,488

4 Claims. (Cl. 202—57)

Our invention relates to the production of toluic acids in a purified form. More specifically, our invention is concerned with the separation of close-boiling neutral materials from toluic acids produced by the air oxidation of xylenes.

Toluic acids can be prepared by the oxidation of xylenes with air or other oxygen-rich gas. One commercial source of xylenes is to be found in petroleum oil. Thus, petroleum naphtha which is rich in dimethyl cyclohexanes is dehydrogenated in the presence of hydrogen in accordance with the hydroforming of Platforming processes to yield xylenes and other compounds, depending upon the purity of the naphtha fraction processed with respect to content of dimethyl cyclohexanes. The toluic acids produced are associated with neutral impurities which have boiling points close to those of toluic acids and which are therefore difficult to separate from the toluic acids.

One method for the production of toluic acids by the oxidation of xylenes and xylene-containing mixtures with air or other oxygen-rich gas is disclosed in the Chester M. Himel application Serial No. 296,718, filed July 1, 1952, Patent No. 2,696,499. In that method, the oxidation is performed in liquid phase using an oxygen-rich gas at temperatures of 130° to 190° C., pressures of 50 p. s. i. g. to 500 p. s. i. g. and a catayst salt which is soluble in the reaction mixture and which is a cobalt, manganese or cerium salt. The oxidation is carried out until from 10 to 50 percent of the aromatic compounds initially present in the reaction mixture have been converted to oxygen-containing compounds.

The toluic acids produced by the oxidation of the xylene-containing fraction can be separated in impure form by distillation, the distillation being carried out under a vacuum in order to minimize decomposition and degradation of certain neutral products, such as tolualdehyde and acetophenone, formed by the oxidation reaction. When such a distillation is performed, there is produced a small fraction of neutral oxidation products which distills between the distillation range of tolualdehydes and the distillation range of the toluic acids. The fraction containing the toluic acids is the last fraction taken off overhead. This fraction, however, also contains varying amounts of neutral materials, depending upon the reaction conditions used in the air oxidation and the handling conditions during the preliminary distillation stages. These neutral materials or neutral oils present in the toluic acid fraction are possibly condensation products of acetophenone and tolualdehydes as well as other oxidation by-products and, as has been stated, have a boiling range close to, or within, the boiling range of the toluic acid isomers. The toluic acid fraction produced from the distillation has a light yellow-green color and a characteristic odor. Analyses indicate that it contains from about 90 to about 98 percent of toluic acids, traces of benzoic acid, with the remainder being the neutral oils mentioned above.

In accordance with our invention, we have found a method whereby the contaminated toluic acids can conveniently be converted into acids of adequate purity. Thus, we have found that when the crude toluic acid fraction is heated for a sufficient period of time at temperatures of about 230 to about 315° C. and conveniently at about atmospheric pressure or superatmospheric pressure the contaminants degrade, crack or polymerize, so that purified toluic acids can conveniently be removed by a simple distillation from the mixture which has been heat treated. The heat treatment usually is carried out for about 10 to about 60 minutes or more, volatile materials and water preferably being removed overhead during the heating, and the subsequent distillation is preferably carried out under vacuum conditions such that the kettle temperature does not exceed about 240° C. in order to minimize additional degradation and the formation of small amounts of light products. As would be expected, the rate at which the contaminants are destroyed is a function of temperature, increasing with increase in temperatures. The heating time required to effect the desired result at a given temperature also depends upon the particular impurities associated with the toluic acids. Thus, our experimental work indicates that the impurities associated with the toluic acids prepared from meta-para-xylenes are more readily degraded than are those prepared from ortho-meta-para-xylenes, and the purification of the toluic acids prepared from xylene fractions containing substantial amounts of non-aromatic hydrocarbons is more difficult than the purification of toluic acids prepared from 98–100 percent aromatic feed stocks.

The following examples are included in order to illustrate the practice of our invention, but are to be considered not limitative.

Example 1

A commercial xylene fraction having the following analysis:

|  | Percent |
|---|---|
| Ortho-xylene | 24.5 |
| Meta-xylene | 47.0 |
| Para-xylene | 17.5 |
| Ethylbenzene | 11.0 | was used (1500 parts by weight) to charge a stirred autoclave, along with 45 parts by weight of cobaltous toluate catalyst. The reactor was stirred and pressured to 500 p. s. i. g. with air and heated to 150° C. When reaction temperature was reached, 40 cu. ft. of air (measured at room temperature and pressure) was passed into the reactor over a 39-minute period. Effluent gases were released through a back pressure regulator which maintained the pressure in the autoclave at 500 p. s. i. g. The effluent which weighed 1700 parts by weight was processed to remove the catalyst and water.

The effluent product from the xylene oxidation was distilled to remove unreacted hydrocarbons and neutral materials boiling at lower temperatures than toluic acids. The residual dark-colored product was then divided into two 200-gram aliquots. The first was distilled in vacuo at 1 mm. to recover a toluic acid fraction which was a light yellow color. Analysis by titration indicated that the distillate (177 grams) contained 94 percent toluic acids (166 grams). The second aliquot was heated at atmospheric pressure in the absence of oxygen at 240–280° C. for about thirty minutes with concomitant removal of water and cracked materials, after which a water-white toluic acid fraction containing 164 grams of toluic acids was taken overhead at atmospheric pressure. This water-white fraction had a purity exceeding 99 percent, as indicated by a neutral equivalent of 136.5.

Example II

A distilled, semi-refined toluic acid sample, produced by the liquid phase, air oxidation of petroleum xylene using a cobaltous toluate catalyst, weighing 2,840 grams and containing 98 percent of toluic acids (determined by titration analysis) was heated to 260° C. at atmospheric pressure and in the absence of oxygen. A small amount of water and light products were removed overhead, after which the distillation temperature rose rapidly to 255° C. Toluic acids were then distilled overhead at atmospheric pressure given a 96 percent recovery of pure toluic acids of 99 plus percent purity. The total distillation time was about six hours.

Example III

A crude toluic acid fraction (89 grams), produced by the liquid phase, air oxidation of petroleum xylene using a cobaltous toluate catalyst and containing 83 grams of toluic acid, was heated at 260–280° C. at atmospheric pressure and in the absence of oxygen for 30 minutes with concomitant distillation of water and low boiling cracked products. The residue was then cooled and distilled in vacuo to give 76 grams of toluic acids having a neutral equivalent of 136.2 compared with a theoretical neutral equivalent for toluic acids of 136.0.

Example IV

A xylene fraction containing 80 percent by weight of aromatic and 20 percent by weight of non-aromatic hydrocarbons was oxidized using essentially the procedure set forth in Example I. The toluic acid fraction was isolated from the oxidation mixture by distillation, divided into aliquots and the aliquots subjected to heat treatment. The purified toluic acids were then obtained by distillation under a vacuum.

The following table sets forth pertinent data with respect to the heat treatment of the various aliquots and the purity of the products isolated by vacuum distillation after heat treatment.

| Sample No. | Temp., °C. | Time (min.) | Purity of Product isolated after heat treatment, percent |
|---|---|---|---|
| 1 | 262 | 10 | 95 |
| 2 | 262 | 20 | 95 |
| 3 | 262 | 30 | 95 |
| 4 | 262 | 60 | 100 |

We claim:

1. A method for the isolation of purified toluic acids from impure toluic acids which have been prepared by the liquid phase, air oxidation of xylenes and which are associated with close-boiling impurities, the said method comprising heating the impure toluic acids in liquid phase in the absence of oxygen at a temperature within the range from 230 to about 315° C. for a period of time sufficient to effect decomposition or polymerization of the impurities, removing volatile materials and water from the zone of heating, and thereafter distilling the heated mixture in order to recover purified toluic acids therefrom.

2. A method according to claim 1 in which in the distillation of the heated mixture in order to recover purified toluic acids the final kettle temperature does not exceed about 240° C.

3. A method according to claim 1 in which the heat treatment in order to effect decomposition or polymerization of the impurities is carried out for a period of from about 10 to about 60 minutes.

4. A method according to claim 2 in which the heat treatment in order to effect decomposition or polymerization of the impurities is carried out for a period of from about 10 to about 60 minutes.

References Cited in the file of this patent
UNITED STATES PATENTS

| | | |
|---|---|---|
| 1,441,341 | Govers | Jan. 9, 1923 |
| 2,366,570 | Souders et al. | Jan. 2, 1945 |
| 2,653,165 | Levine | Sept. 22, 1953 |
| 2,696,499 | Himel | Dec. 7, 1954 |